United States Patent
Younkin

(10) Patent No.: US 7,044,024 B1
(45) Date of Patent: May 16, 2006

(54) APPARATUS AND METHOD FOR SERVO CONTROL OF AN AIRCRAFT

(75) Inventor: James R. Younkin, Springdale, AR (US)

(73) Assignee: TruTrak Flight Systems, Inc., Springdale, AR (US)

( * ) Notice: Subject to any disclaimer, the term of this patent is extended or adjusted under 35 U.S.C. 154(b) by 228 days.

(21) Appl. No.: 10/436,658

(22) Filed: May 12, 2003

(51) Int. Cl.
*F16H 37/06* (2006.01)

(52) U.S. Cl. .................. 74/665 A; 74/325; 74/329; 180/65.1; 180/65.6; 180/65.7; 192/48.2; 192/48.3; 192/55.1; 192/56.6; 192/84.96; 192/84.961; 464/46

(58) Field of Classification Search .................. 74/325, 74/329, 665 A, 333, 340, 349; 180/65.1, 180/65.6, 65.7; 192/48.2, 48.3, 55.1, 56.6, 192/104 B, 104 F, 103 B, 66.21, 66.23, 88 B, 192/85 AT, 48.8, 48.9, 70.15, 109 F, 85 A, 192/85 AA, 85 C, 84.961, 84.96; 464/46; 92/84, 129
See application file for complete search history.

(56) References Cited

U.S. PATENT DOCUMENTS

| | | | | | |
|---|---|---|---|---|---|
| 784,285 | A | * | 3/1905 | Sturtevant et al. | 74/336 R |
| 2,519,118 | A | * | 8/1950 | Curtis et al. | 388/826 |
| 3,105,371 | A | * | 10/1963 | Forrest | 464/46 |
| 3,665,278 | A | * | 5/1972 | Kazmarek | 318/466 |
| 3,933,059 | A | * | 1/1976 | Houck | 74/661 |
| 4,542,812 | A | * | 9/1985 | Westley | 464/46 |
| 4,914,368 | A | * | 4/1990 | Orton | 318/663 |
| 5,337,848 | A | * | 8/1994 | Bader | 180/65.2 |
| 5,596,902 | A | * | 1/1997 | McMillen | 74/7 C |
| 5,631,511 | A | * | 5/1997 | Schulmann et al. | 310/83 |
| 5,716,299 | A | * | 2/1998 | Sommer | 475/338 |
| 5,899,064 | A | * | 5/1999 | Cheung | 60/406 |
| 5,910,190 | A | * | 6/1999 | Brookins | 74/329 |
| 6,202,499 | B1 | * | 3/2001 | Brinn | 74/329 |

* cited by examiner

*Primary Examiner*—Charles A. Marmor
*Assistant Examiner*—David D. Le
(74) *Attorney, Agent, or Firm*—James Richards

(57) ABSTRACT

Autopilot control of an aircraft is accomplished using a servo wherein the input shaft and output shaft are collinear. In one embodiment, the output shaft is supported, in part, by the input shaft. In further embodiments an engage clutch mechanism is provided to allow decoupling of the motor from the output shaft, and a slip clutch mechanism is provided to limit the torque output of the servo to enhance the safety of operation. The collinear shaft arrangement enables the engage clutch mechanism and slip clutch mechanism to synergistically utilize components for multiple functions.

12 Claims, 9 Drawing Sheets

APPARATUS AND METHOD FOR SERVO CONTROL OF AN AIRCRAFT

BACKGROUND OF THE INVENTION

1. Field of the Invention

The present invention relates in general to the field of autopilot control systems, and more specifically, to the field of servo control devices that can automatically control an aircraft.

2. Background of the Related Art

An autopilot for a typical small, piloted aircraft is an aid to the pilot and functions to reduce the pilot's workload, reducing fatigue and enabling the pilot to concentrate on other tasks such as navigating, checking the instruments, or simply enjoying the flight. Such autopilots may handle only one axis, such as heading, or may handle all control surfaces and may be coupled, as desired, to radio or GPS navigation aids to enable fully automated control between or among one or more geographical points according to a preset plan.

A typical autopilot includes a control logic unit that receives pilot commands and interfaces with flight sensors and possibly radio navigation systems. In some systems, some of the flight sensors may be included in the same module with the control logic unit. The output of the control logic unit drives one or more servos. The servo is the device that receives electrical commands from the autopilot control logic unit and translates these commands into mechanical motion which in turn drives an associated aircraft control surface such as the ailerons or elevator.

Autopilots for piloted aircraft have special needs with respect to servo devices. The servo should be extremely reliable and pass stringent safety requirements. The safety requirements include a failure mode analysis wherein single or sometimes double failures shall not result in the unsafe or uncontrollable operation of the aircraft. This typically results in a requirement for several independent ways to remove or decouple the servo from the aircraft control mechanism.

In addition to stringent safety requirements, the servo should be lightweight, cost competitive, simple to install, and should be relatively easy to produce even at relatively low production volumes. This generally implies a heavy reliance on off-the-shelf standard components to make the servo, especially with respect to the motor.

Since autopilots are frequently added after manufacture of the aircraft, the autopilot and servo should preferably be easy to install in the field by service shops or by do-it-yourself mechanics and "home-built" aircraft builders, often with minimal documentation or "factory" installation designs.

A further desirable property is an easy interface to a digital autopilot control logic unit. Autopilots of recent design rely heavily on digital processing of sensor signals including rate gyros and accelerometers. It is thus, desirable that the servo present a simple interface to the digital autopilot control logic unit.

Existing servos typically utilize DC servomotors which require servo amplifiers. However, these DC servomotors and servo amplifiers are frequently too large or fall short on one or more of the features needed by the digital autopilot. Other existing servos utilize stepping motors. However, the torque capacity of these stepping motors is insufficient for some applications and no disconnect is provided.

Thus, there is a need for improved digital autopilot servos that meet the size, weight, safety, and interface needs of modern general aviation and "home-built" aircraft systems. These needs and other needs are satisfied by the autopilot servos of the present invention.

BRIEF SUMMARY OF THE INVENTION

In brief, the present invention is an autopilot servo and method for using an autopilot servo that has a compact and efficient architecture to better control an aircraft, and in particular, an aircraft which may carry passengers.

In accordance with the present invention, autopilot control of an aircraft is accomplished using a servo wherein the input shaft and output shaft are collinear. In one embodiment, the output shaft is supported, in part, by the input shaft. In further embodiments an engage clutch mechanism is provided to allow decoupling of the motor from the output shaft, and a slip clutch mechanism is provided to limit the torque output of the servo to enhance the safety of operation. The collinear shaft arrangement enables the engage clutch mechanism and slip clutch mechanism to synergistically utilize components for multiple functions thereby reducing complexity and saving space and weight.

Included in the many advantages and features of the invention are superior safety, economy, ease of installation and interface with the autopilot control logic unit. These and other features and advantages will become apparent as the particular embodiments are more fully described in the following detailed description and accompanying drawings.

BRIEF DESCRIPTION OF THE DRAWINGS

The present invention is described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE EMBODIMENTS

The present invention will now be described more fully in detail with reference to the accompanying drawings, in which the preferred embodiments for the invention are shown. This invention should not, however, be construed as limited to the embodiments set forth herein; rather, these embodiments are provided so that this disclosure will be thorough and complete and will fully convey the scope of the invention to those skilled in the art. Like numbers refer to like elements throughout.

In brief, the present invention is an autopilot servo and method for using an autopilot servo that has a compact and efficient architecture to better control an aircraft and is particularly directed to aircraft which may carry passengers. Included in the many advantages and features of the invention are superior safety, economy, ease of installation and ease of interface with an autopilot controller.

The servo architecture achieves efficiency in design and production by placing the components and functions on two axes wherein an input and output shaft are collinear and thus share the same axis. This architecture yields space and weight saving advantages by enabling components to serve multiple functions, thus reducing component count. The basic architecture will now be described with reference to FIG. 1.

Figure 1:
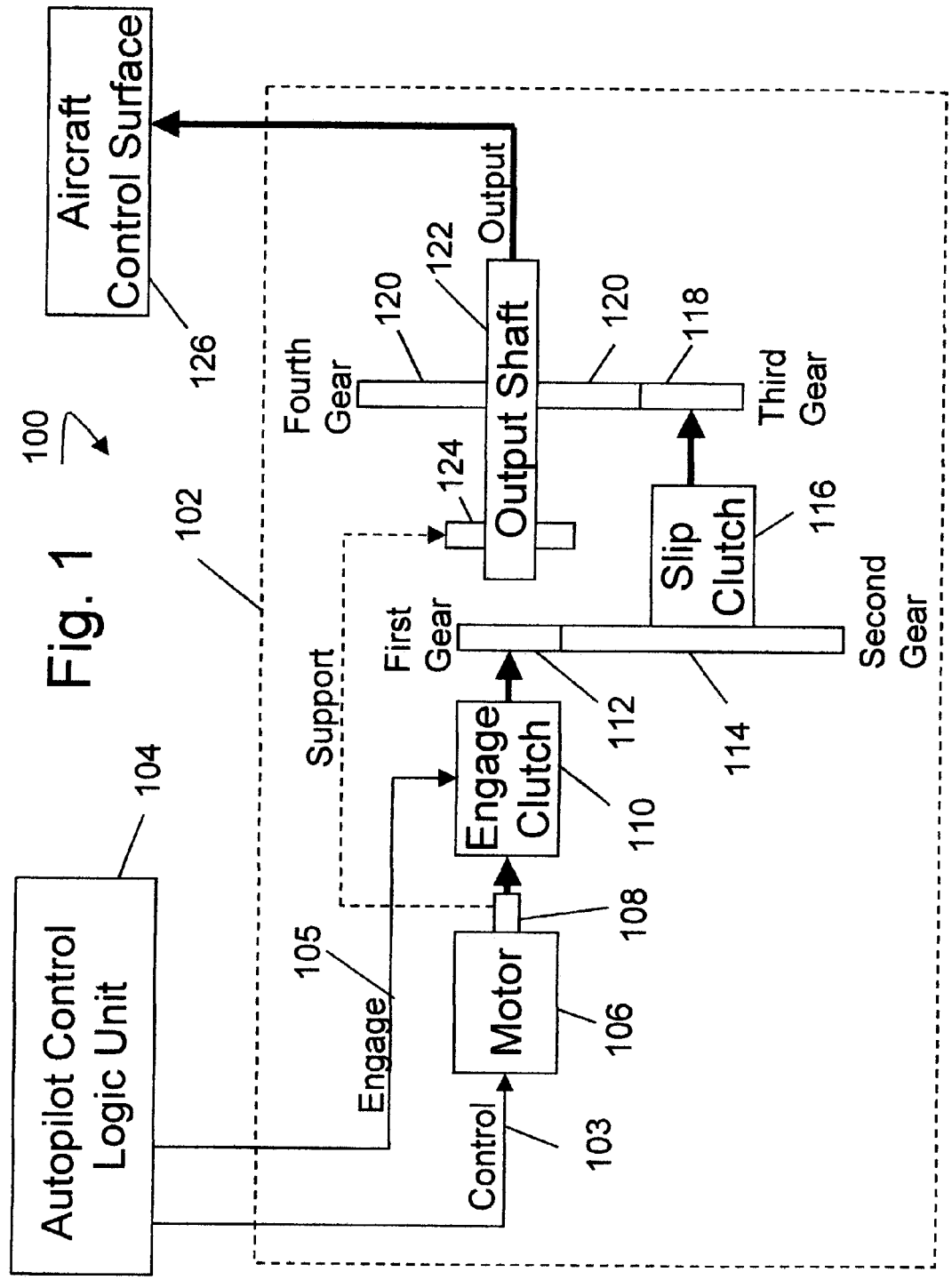
FIG. 1 is a simplified exemplary block diagram illustrating the component relationships of an aircraft and autopilot using a servo in accordance with the present invention.

FIG. 1 is a simplified exemplary block diagram illustrating the component relationships of an autopilot using a servo in accordance with the present invention. Note that the terms servo, servo control device, and servo actuator are equivalent terms which refer to a device that receives an electrical signal from an autopilot control logic unit and converts the electrical signal to a mechanical output to drive an aircraft control mechanism. Referring to FIG. 1, an autopilot system 100 is shown with particular detail illustrated with respect to a servo 102. An autopilot control logic unit 104 sends control signals 103 to a motor 106 having a shaft 108 which is coupled to an optional engage clutch mechanism 110. The engage clutch mechanism 110 receives an engage signal 105 from the autopilot control logic unit 104. In accordance with the engage signal 105, the engage clutch mechanism 110 engages or disengages the coupling between the shaft 108 of the motor 106 and a first gear 112 coupled to an output of the engage clutch mechanism 110.

The first gear 112 couples to a second gear 114 on a second axis. The second gear 114 is coupled through an optional slip clutch mechanism 116 to a third gear 118. The function of the slip clutch mechanism 116 is to limit the torque output of the servo 102 for enhanced safety of the autopilot system 100 in the case of autopilot failures resulting from a runaway motor 106 or failure of the engage clutch mechanism 110, assuming the engage clutch mechanism 110 is provided.

The third gear 118 drives a fourth gear 120 coupled to an output shaft 122. The output shaft 122 is collinear with the input shaft 108. The collinear arrangement allows the output shaft 122 to share components with the input shaft 108 by receiving support 124 from the input shaft 108, thus saving complexity and space. The output shaft 122 is then coupled through aircraft linkage to an aircraft control surface 126, for example, the ailerons. Additional servos 102 may operate additional control surfaces 126. In a prior art servo, the output shaft would be supported by dedicated bearings on each end rather than sharing bearings on one end and would occupy a third axis, requiring more space for implementation.

Figure 2:
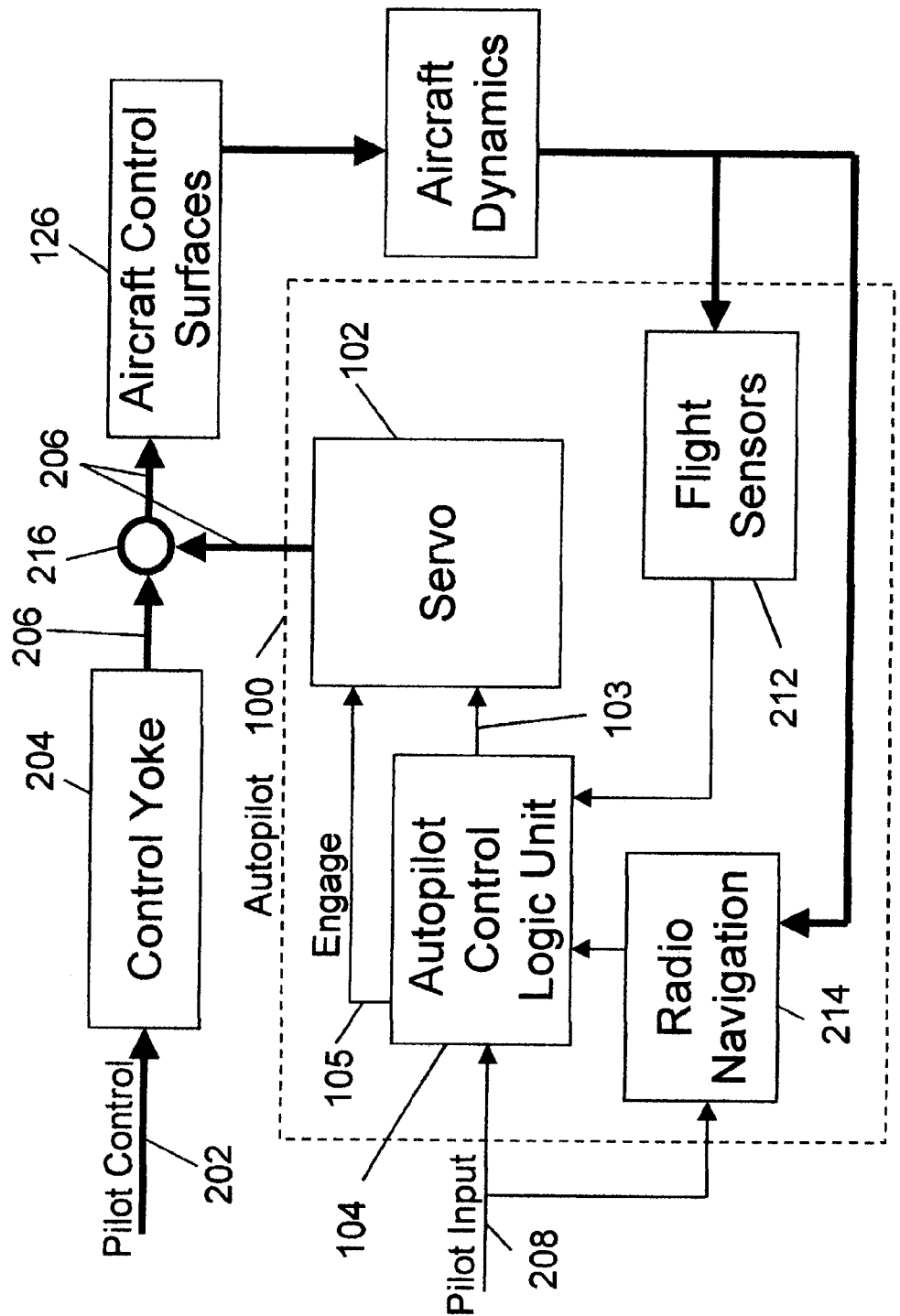
FIG. 2 is a simplified functional block diagram illustrating the control logic of a typical aircraft incorporating a servo in accordance with the present invention.

FIG. 2 is a simplified functional block diagram illustrating the control logic of a typical aircraft incorporating a servo in accordance with the present invention. In the example of FIG. 2, a single aircraft axis is controlled by a single servo 102. A single axis autopilot would typically control the roll axis of an airplane for wing leveling and heading control. In a more advanced autopilot, additional aircraft control surfaces may be controlled by additional servos. Such additional control surfaces may include, for example, the elevator, rudder and trim.

Referring to FIG. 2, the aircraft may be controlled directly by the pilot or indirectly through the autopilot. Direct pilot control, where the pilot simply "flies" the airplane, is accomplished by applying control forces 202 directly to a control yoke 204, which is mechanically connected through linkages 206 to the aircraft control surfaces 126, in this case, the ailerons 126. (The control yoke 204 in an aircraft is analogous to the steering wheel in an automobile.)

In autopilot mode, the pilot enters commands 208 into the autopilot control logic unit 104 and engages the autopilot 100, which engages the servo 102. Engaging the autopilot 100 allows the servo 102 to apply control forces through mechanical linkages 206 to the control surfaces 126. Engaging the servo 102 may involve engaging a mechanical clutch 110 or alternatively, may involve switching or enabling electrical power to a servo motor, or a combination of both, as described in more detail below.

Autopilot control is accomplished by electrically, including digitally, comparing flight commands 208, such as a commanded heading, with information about the aircraft flight states sensed by flight sensors 212. Aircraft flilght states may include heading, velocity, bank angle and other measurements. If there is a difference between the commanded flight states and the measured flight states, the servo 102 is commanded to move the ailerons 126 in a direction and amount to correct the difference, thereby keeping the airplane on the heading commanded by the pilot. Examples of flight sensors 212 include, but are not limited to, heading gyros, rate gyros, altimeters, and accelerometers. In addition to heading control, the autopilot 100 can offer radio navigation 214 coupling. Examples of radio navigation systems 214 include, but are not limited to GPS, LORAN, VOR, TACAN, and ILS.

In the autopilot 100 system, special consideration can be given to the fact that the servo 102 is mechanically connected 216 to the aircraft control linkage 206. In direct pilot control, there may be additional load on the control yoke 204, requiring additional steering effort from the pilot to overcome an added load due to back driving the servo 102. It is thus desirable that the disengaged load presented by the servo 102 should be sufficiently low so as not to impair the pilot's handling of the aircraft.

The mechanical connection 216 provides safety benefits in autopilot control mode. If, for example, the autopilot control logic unit 104 were to fail and cause a hard roll to the right, the pilot's fastest corrective action may be to grab the control yoke 204 and force it to the left against the torque of the servo 102. Once flight is stabilized, the pilot may then locate and operate a disengage switch for the autopilot 100. It is thus desirable to provide safe torque limits and back drive capability in the servo 102 to allow this maneuver. The servo 102 back drive capability also provides extra insurance against a disengage failure. The pilot should be able to fly and land the airplane while overcoming the forces of a runaway autopilot 100.

The present invention addresses the need for a back drivable servo 102 with a torque limit, and a redundant disengage mechanism 110, as well as other needs. These needs are satisfied in a cost effective, lightweight package. Further details of the invention will now be described with reference to FIG. 3.

Figure 3:
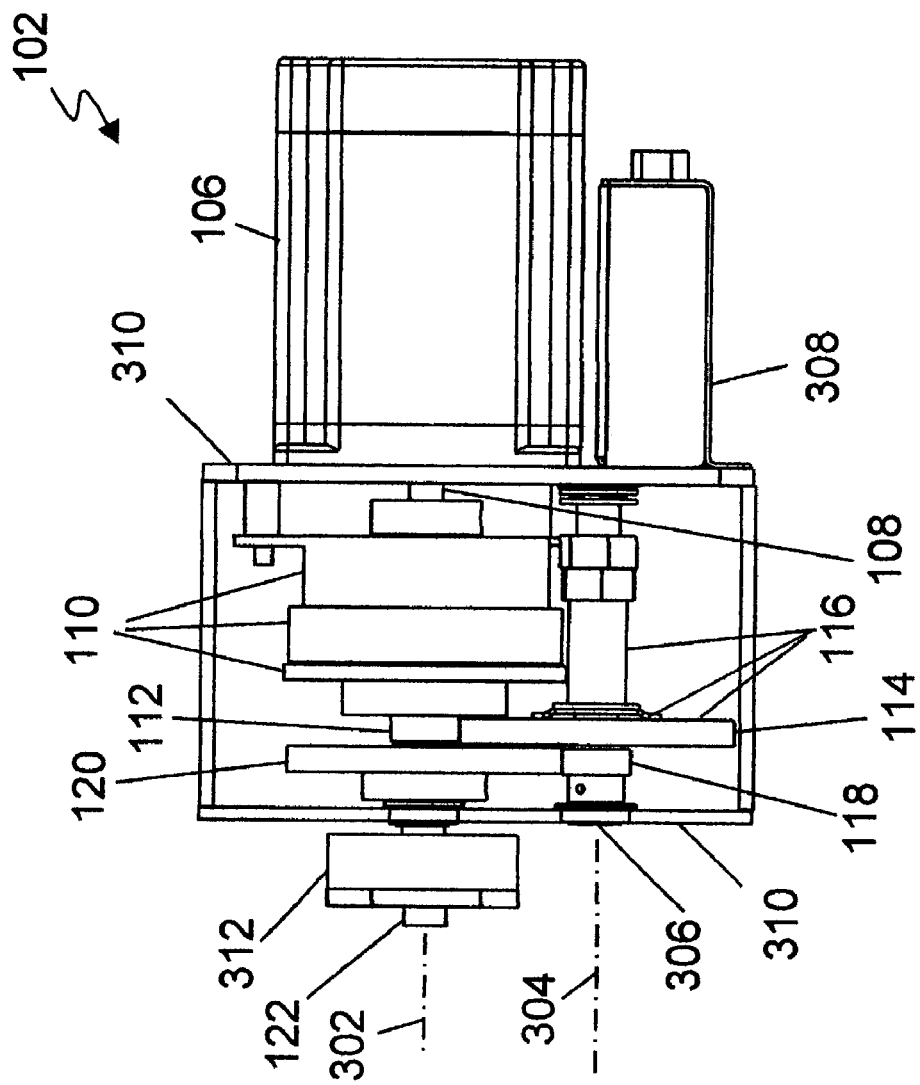
FIG. 3 is a side view illustrating the basic components of a preferred embodiment of a servo constructed in accordance with the present invention.

FIG. 3 is a side view of a preferred embodiment of the servo 102 of FIG. 2 constructed in accordance with the present invention. Referring to FIG. 3, the servo 102 includes three shafts 108, 122 and 306 mounted on two parallel axes 302 and 304. The first axis 302 includes a motor shaft 108, which is also referred to herein as the first shaft 108 or input shaft 108. The first axis 302 also includes an output shaft 122, which is also referred to herein as the third shaft 122. The input shaft 108 and output shaft 122 are disposed collinearly along the first axis 302. The second axis 304 is defined by the second shaft 306, which is parallel to the first axis 302. The parallel axis arrangement has certain advantages of simplicity and economy that will become apparent in the detailed discussions to follow.

Referring to FIG. 3, a stepping motor driver 308 is optionally mounted on a servo housing 310. The stepping motor driver 308 provides power drive signals to the stepping motor 106 in accordance with control signals 113 from the autopilot control logic unit 104. Alternatively, the stepping motor driver 308 may be included in the control logic unit 104; however, close proximity of the stepping motor driver 308 to the motor 106 simplifies wiring between the autopilot control logic unit 104 and the servo 102 by requiring that only control signals 103 and not power drive signals be transmitted from the control logic unit to the servo 102 package.

The stepping motor 106 is mounted to the servo housing 310. The stepping motor 106 may alternatively be mounted to an optional torque sensor flexible element (not shown). The torque sensor may be used to provide feedback information to the autopilot control logic unit 104, which may use this information to, for example, control a trim servo. The trim servo is typically used to operate a trim tab so as to reduce the control force required for control of a main control surface, especially an elevator. The flexible element is then mounted to the servo housing 310. The flexible element in combination with an optical pickoff (not shown) may be used to sense torque reaction produced by the stepping motor 106 as the stepping motor 106 drives the aircraft control surfaces. Other sensors may be employed to determine motor torque as are known in the art.

The stepping motor 106, and in particular, the input shaft 108 is coupled through the engage clutch mechanism 110 to the first gear 112. The engage clutch mechanism 110 is energized in order to couple the motor 106 and input shaft 108 to the first gear 112. Alternatively, the motor 106 may be coupled and decoupled from the aircraft control surfaces 126 by switching the power to the motor 106; however, the use of an engage clutch mechanism 110 has certain advantages. The engage clutch mechanism 110 may be operated by a circuit independent from the motor drive logic to provide redundant methods of decoupling the motor torque from the aircraft control surfaces 126. The operation of the engage clutch mechanism 110 has a further advantage of eliminating motor inertia and residual motor cogging and reluctance torque which could provide an undesirable back drive load to the pilot.

The first gear 112, which is operational on the first axis, is coupled to a second gear 114, which is operational on the second axis, concentric to the second axis 304 and rotating around the second axis 304, but not directly coupled to the second shaft 306. The second gear 114 is coupled to the second shaft 306 through a spring loaded slip clutch 116.

The spring loaded slip clutch 116 includes components recessed in the second gear 114. The third gear 118 is mounted on the second shaft 306 so as to receive torque from the second shaft 306 and drive the fourth gear 120.

The fourth gear 120 is mounted on the output shaft 122, which is collinear with the input shaft 108. The output shaft 122 has one end supported by the input shaft 108 in conjunction with the engage clutch mechanism 110. The other end of the output shaft 122 is supported by the servo housing 310. The output shaft 122 is free to rotate relative to the input shaft 108, but is fixed to the fourth gear 120. The output shaft 122 drives a coupling device 312, which may typically be a capstan or arm for further coupling to the aircraft control linkage.

The parallel shaft arrangement allows substantial savings in components by allowing synergistic integration of functions and dual use of components. For example, the supporting of the output shaft 122 by the input shaft 108 together with the engage clutch mechanism 110 potentially eliminates a gear pass and several bearings. In addition, the mounting of the first gear 112 on the engage mechanism 110 shares bearings with the output shaft 122 that may, in alternate configurations, result in separate bearings. Further, the second gear 114 also operates as a part of the slip clutch 116 mechanism, reducing parts count and assembly time. Additional examples will be described as the individual sub-assemblies are discussed in greater detail herein.

Figure 4:
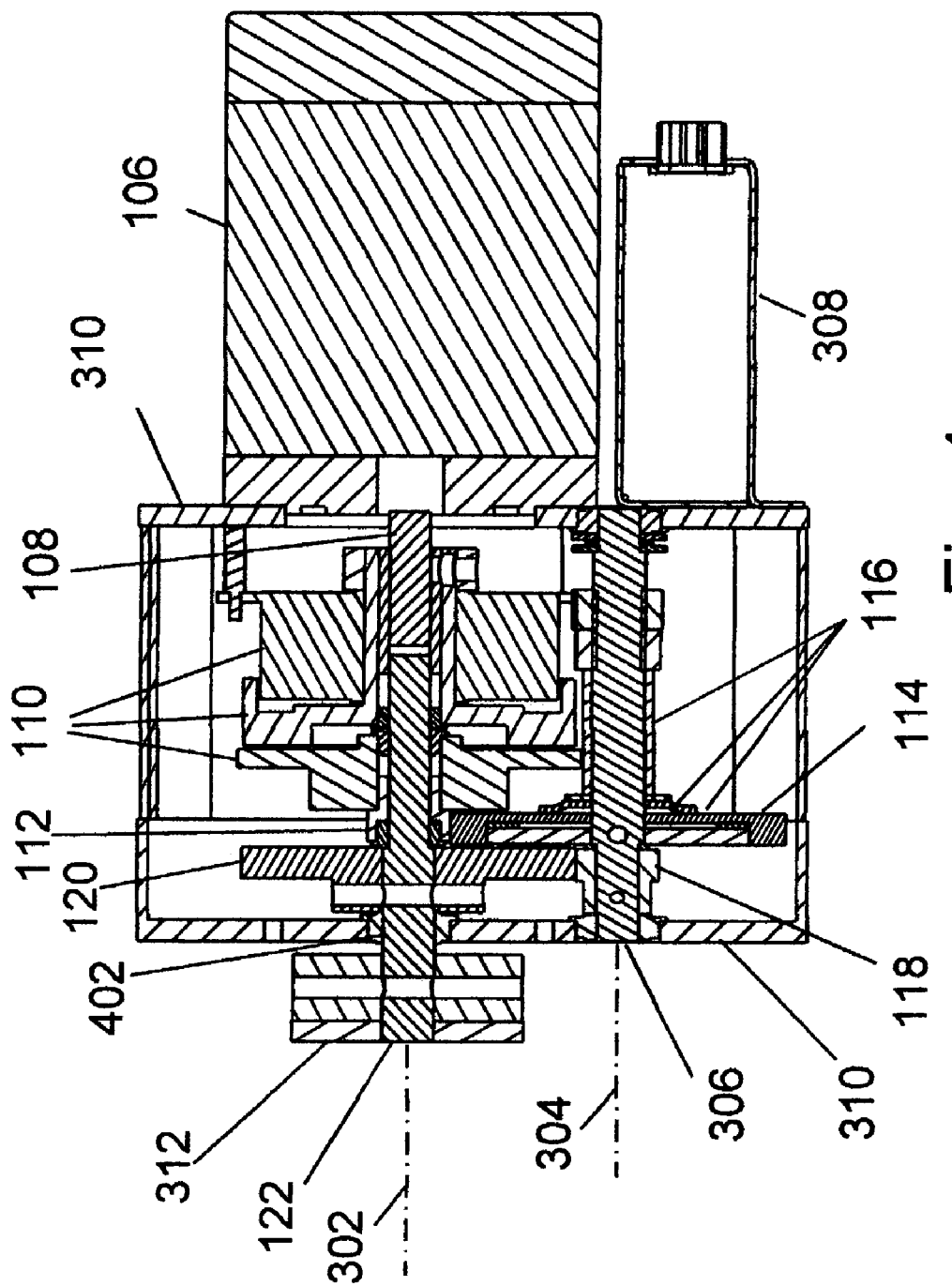
FIG. 4 is a section view showing two parallel shaft assemblies of the servo shown in FIG. 3 and the components assembled thereon.

FIG. 4 is a section view showing the two shaft assemblies of the servo 102 shown in FIG. 3 and components assembled thereon. The section view of FIG. 4 is in a plane through the two parallel shaft axes 302 and 304 and shows in greater detail the relationship among the input 108 and output shafts 122 and the engage clutch mechanism 110. The input shaft 108 is the motor shaft 108, which extends from the motor 106 to part way through the engage clutch mechanism 110. One end of the output shaft 122 extends into the engage clutch mechanism 110 to receive support 124 (FIG. 1) from the input shaft through the engage clutch mechanism. The other end of the output shaft 122 extends through the servo housing 310, receiving support from the servo housing 310 through ball bearing 402 and allowing attachment of an output coupling device 312 such as a capstan or arm on the exterior portion of the output shaft 122.

Figure 5:
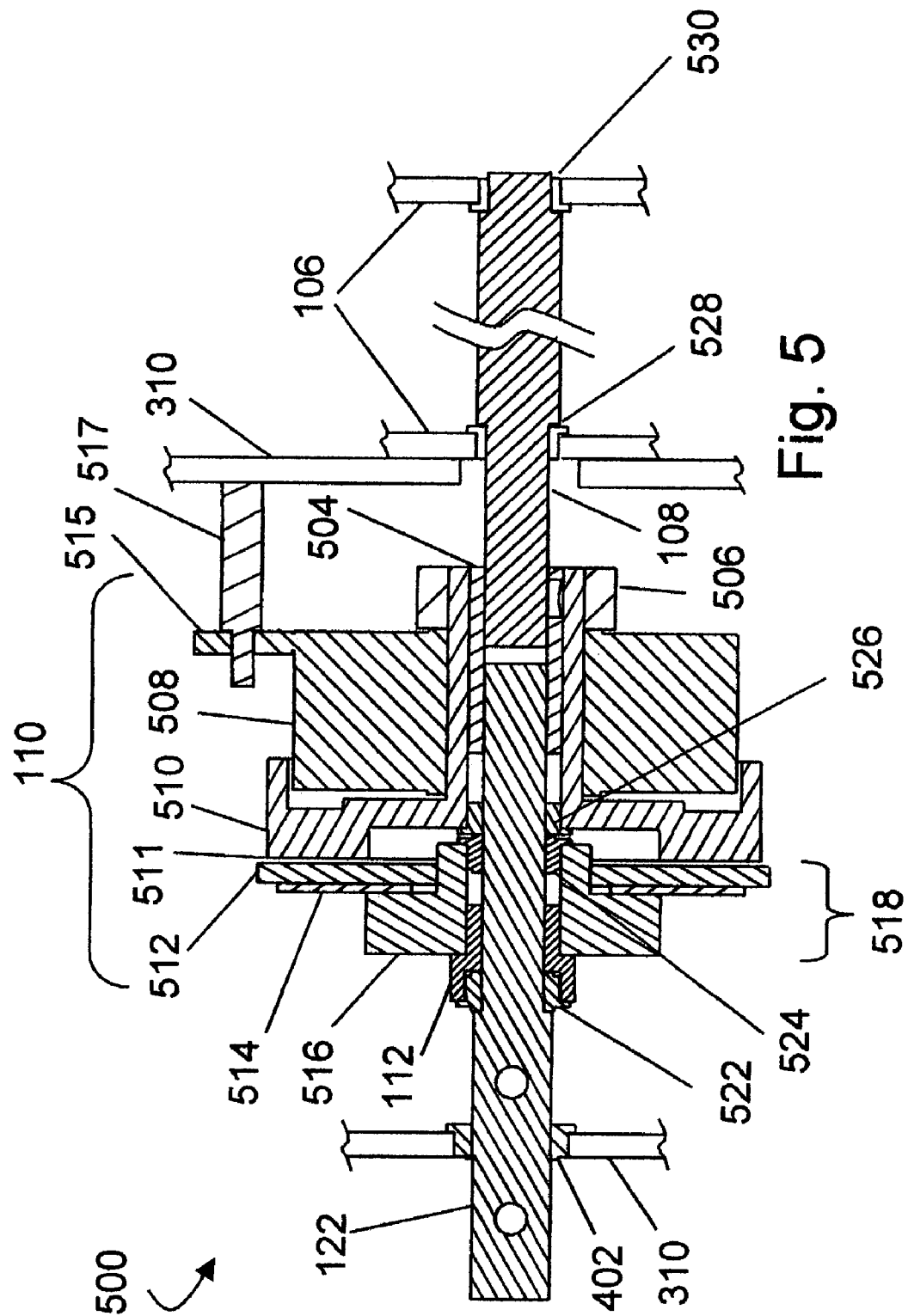
FIG. 5 is a detail section drawing showing the relationship among an input and an output shaft and an engage mechanism of the servo shown in FIG. 3.

FIG. 5 is a detail section drawing showing the relationship among the input 108 and output shafts 122 and the engage clutch mechanism 110 of the servo 102 shown in FIG. 3. The components shown in FIG. 5 comprise an input/output shaft assembly 500. For clarity the output gear and output components and connections with the second and third gears are not shown. Referring to FIG. 5, the input shaft 108, is supported by two bearings 528 and 530, typically provided in the motor 106. These bearings 528 and 530 may be preloaded to provide both lateral and axial shaft support. The input shaft 108 is coupled to the optional engage clutch mechanism 110 mounted thereon. When provided, the engage clutch mechanism 110 comprises a bushing 504, a ring 506, a coil assembly 508, a clutch rotor element 510, a coupling ring 512, a return spring 514, and a hub 516. The bushing 504 adapts the mounting hole diameter of the clutch rotor 510 to the diameter of the input shaft 108. If the mounting hole diameter of the clutch rotor 510 matches the diameter of the input shaft, then the bushing 504 may be optional. The ring 506 provides support for setscrews (not shown) that clamp through the clutch rotor 510 and bushing 504 to the input shaft 108 to couple the clutch rotor 510 to the input shaft 108. The coil assembly 508 is fixed rotationally to the servo housing 310 by an arm 515 that contacts a post 517 secured to the servo housing 310. The coil assembly 508 rides rotationally on the clutch rotor 510, allowing the clutch rotor 510 to rotate within the coil 508. The coil assembly 508 is fixed rotationally to prevent the coil termination wires from wrapping around the engage clutch mechanism 110.

An engage clutch output assembly 518 (optional) comprises a coupling ring 512, a return spring 514, and a hub 516. The output assembly 518 is coupled to the first gear 112 with setscrews (not shown). Other means of coupling known in the art may be used. The first gear 112 and output assembly 518 share a pair of ball bearings 522 and 524 that ride on the output shaft 122 and allow the engage clutch output assembly 518 to rotate around the output shaft 122. Bearing 524 has an extended inner race that, in combination with bearing 526, controls a gap 511 between the clutch rotor 510 and coupling ring 512 when the coil 508 is de-energized.

The engage clutch mechanism 110 forms a magnetic clutch configured to engage and transmit motor torque when the coil 508 is energized, drawing the coupling ring 512 into contact with the clutch rotor element 510. When the coil 508 is de-energized the magnetic attraction between the coupling ring 512 and clutch rotor 510 is reduced to a negligible level and the coupling ring 512 is then drawn away from the clutch rotor 510 by the return spring 514, thereby allowing the coupling ring 512 to turn independently relative to the clutch rotor 510.

The integration of the first gear 112 into the output assembly 518 allows the sharing of the ball bearings 522, 524 and 526 and reduction of complexity over alternative configurations. The output shaft provides lateral support for the output assembly through ball bearings 522 and 524. Axial support for the output assembly is transmitted through ball bearings 522, 526 and 524.

Ball bearings 522, 524 and 526 and the bushing 504 provide support 124 (FIG. 1) to the output shaft 122. The support 124 is lateral support and axial support transmitted from the input shaft 108 through the bushing 504 and bearings 522, 524 and 526 that contact both the output shaft 122 and engage clutch mechanism 110. The engage clutch mechanism 110 is mounted on the input shaft 108, thus the input shaft 108 provides support 124 to the engage clutch mechanism 110 and indirectly to the output shaft 122.

The components of FIG. 5 that are mounted on or associated with the first shaft comprise a first shaft assembly. The first shaft assembly thus includes the engage clutch mechanism 110, when provided, and the first gear 112.

Figure 6:
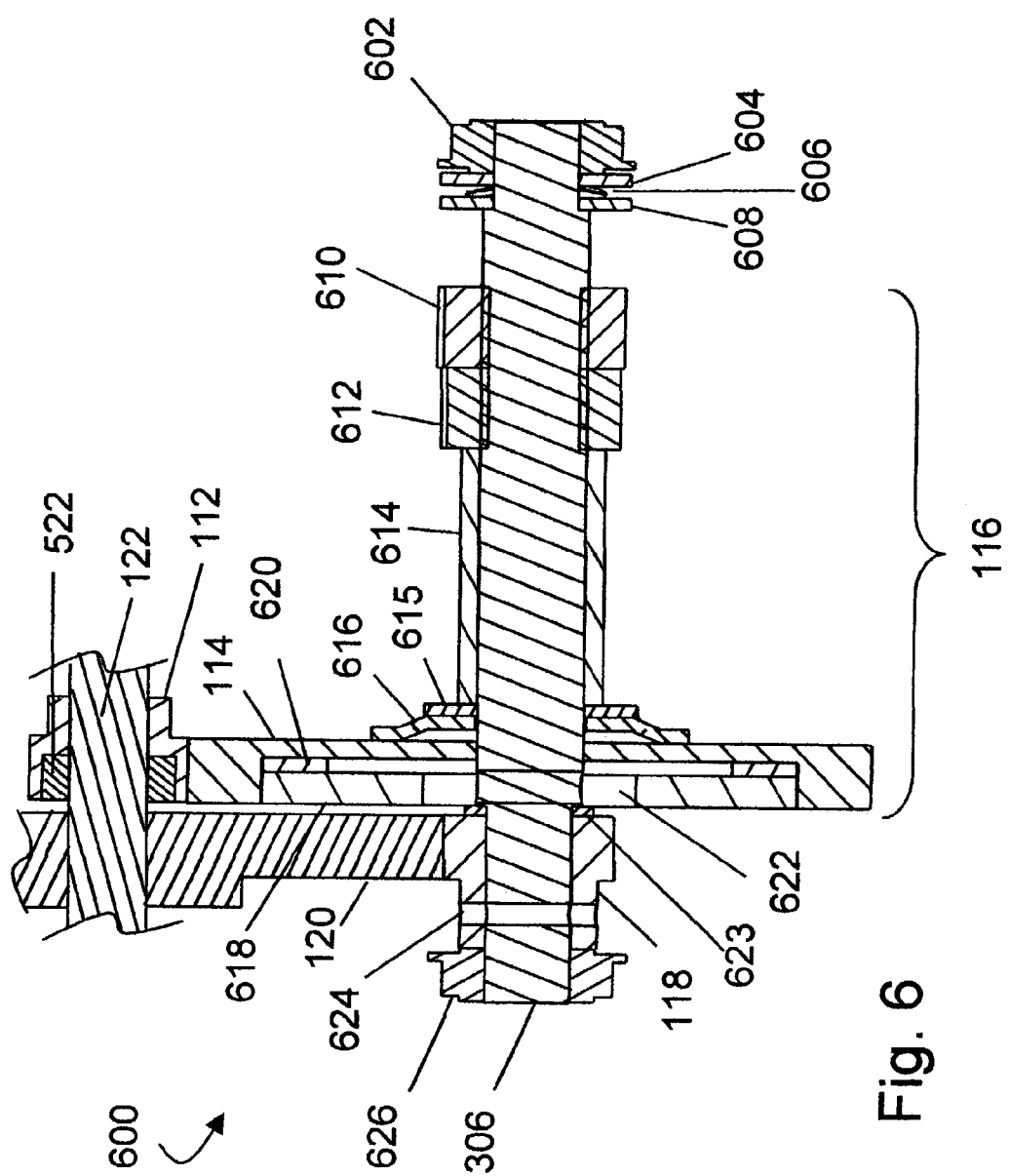
FIG. 6 is a detail section drawing of the second shaft assembly of the servo shown in FIG. 3 including the slip clutch mechanism.

FIG. 6 is a detail section drawing of a second shaft assembly 600 of the servo 102 shown in FIG. 3 including the slip clutch mechanism 116. Other portions of the servo 102 are not shown for clarity. Referring to FIG. 6, the second shaft assembly 600 comprises the second shaft 306, a first bearing 602, a first flat washer 604, a compression washer 606 for bearing preload, a second flat washer 608, a jam nut 610, an adjusting nut 612, a sleeve 614, a washer 615, a clutch spring 616, the second gear 114, a clutch disk 618, a clutch friction washer 620, a coupling pin 622, a spacing washer 623, the third gear 118, a roll pin 624, and a second bearing 626.

The second shaft assembly 600 forms a convenient unit that may be assembled and adjusted to a specified slip torque as an independent unit and then inserted into the servo 102 at an appropriate stage in manufacture.

In operation, the second gear 114 is coupled to the first gear 112, which is driven by the motor 106 through the engage mechanism 110 (see FIG. 3). The second gear 114 is not directly coupled to the second shaft 306, but couples to through the optional slip clutch mechanism 116. The slip clutch mechanism 116, when provided, may be partly housed within the second gear 114 and utilize the second gear 114 as one of its friction faces. The second gear 114 transmits power through the friction washer 620 to the clutch disk 618. One side of the second gear 114 is recessed for receiving the clutch disk 618 and friction washer 620 so that the clutch disk 618 will hold the friction washer 620 captive within the recess. Acetal is a suitable material for the friction washer 620 because of its stable friction properties. Other materials known in the art as suitable for friction pads may be used as alternatives such as materials typically used in industrial clutch or a brake application.

The second gear 114, friction washer 620, and clutch disk 618 are held in contact under a calibrated force by the clutch spring 616, which is set to the proper compression with the adjusting nut 612 acting through the sleeve 614. A wave washer, Bellville washer, compression spring, or other compression means known to those in the art may be used for the spring 616. A jam nut 610 is provided to stabilize the adjusting nut once the proper setting is achieved.

The clutch disk 618 is coupled to the second shaft 306 by a pin 622. The second shaft 306 is then coupled to the third gear 118 through a roll pin 624. The third gear 118 then couples to the fourth gear 120, which is on the output shaft 122 (see FIG. 3). The second shaft 306 is set in the servo housing 310 with two ball bearings 626 and 602 for minimum friction.

The location of the slip clutch 116 on the second shaft 306 internal to the servo allows sufficient axial space to provide adjustment components, the adjusting nut 612 and jam nut 610. An alternative assembly for this function is a combined torque-limiting clutch and output capstan; however, the external location does not provide enough space to allow the use of the adjusting nut 612 and jam nut 610 in the same convenient way as the internal location.

A further advantage of locating the slip clutch 116 on the second shaft 306 is that a lower torque setting is required to produce an equivalent output torque limit due to the gear pass comprising the third gear 118 and fourth gear 120.

In a further benefit, the servo 102 can have a high torque output capability resulting from two gear passes: gears 112 and 114, and gears 116 and 118. Two gear passes can easily achieve a combined gear ratio of sixteen to one or other ratios as needed. The two gear passes may be symmetrical (the same ratio) for greater economy through parts commonality.

Placement of the torque limiting slip clutch 116 on an internal shaft (second shaft 306) rather than the output shaft 122 allows greater freedom of selection of coupling devices 312 to be mounted on the output shaft 122, which simplifies installation.

Simplicity of installation can be benefited by the placement of the torque limiting slip clutch 116 on an internal shaft, which is the second shaft 306 in the embodiment described herein, permitting flexible selection of coupling devices on the output shaft 122 because the complexity of the slip clutch 116 has been moved internally.

Figure 7:
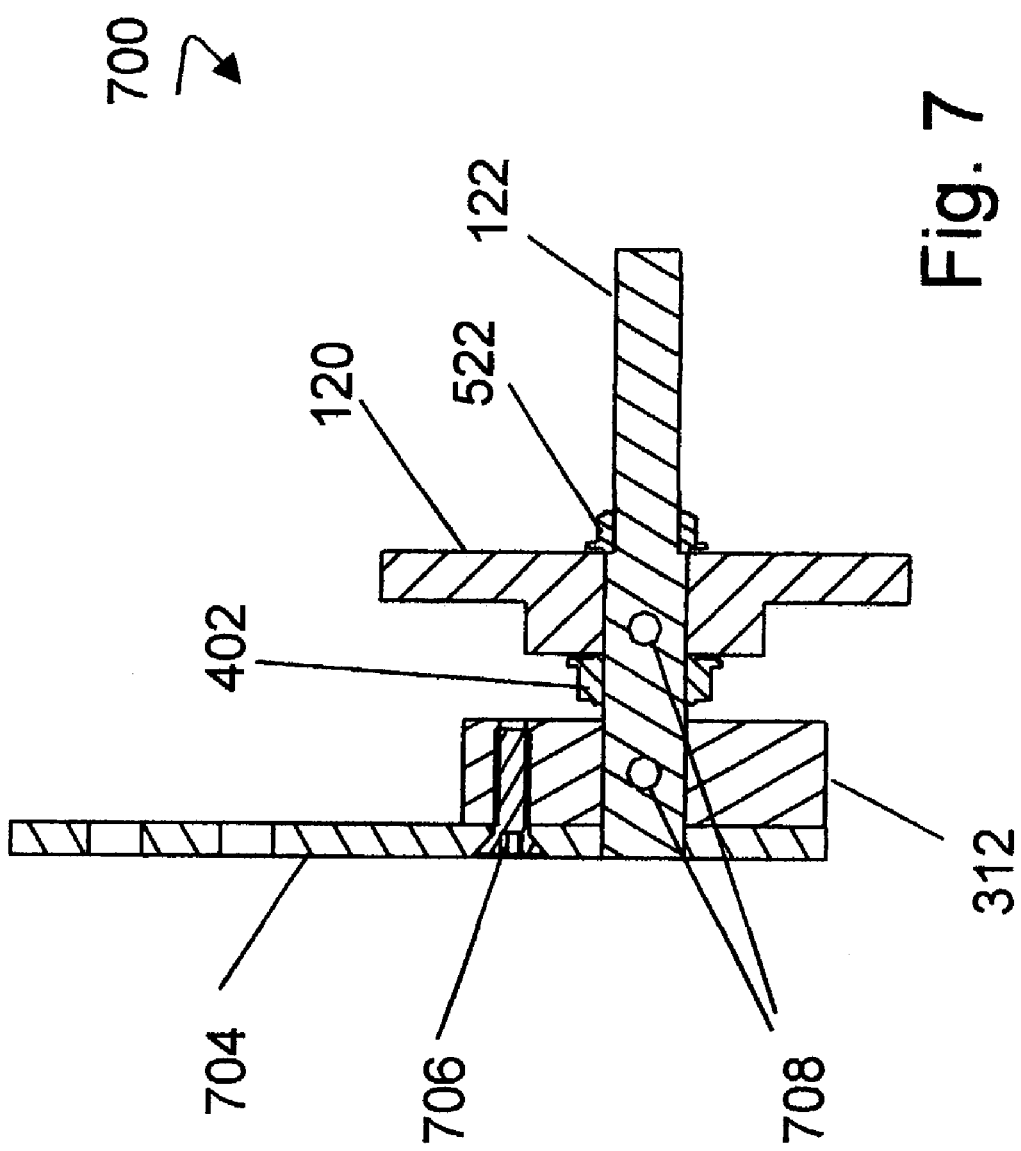
FIG. 7 is a section drawing showing the output shaft detail of the servo shown in FIG. 3.

FIG. 7 is a section drawing showing an output shaft assembly 700 detail of the servo shown in FIG. 3. The output shaft assembly 700 includes the output shaft 122, the fourth gear 120, the output coupling device 312, and a ball bearing 402. The fourth gear 120 and output coupling device are coupled to the output shaft using roll pins 708. The output coupling device includes an arm 704 attached to a hub 312 with screws 706.

In operation, the fourth gear 120 is coupled to the third gear 118 to receive control motion, which is coupled to the output shaft 122 and transmitted to the output coupling device 312 (see FIG. 3). One end of the output shaft 122 is supported by the engage clutch mechanism 110, which is mounted on and supported by the motor shaft 108. The motor shaft 108 is supported by bearings 528 and 530 within the motor 106 housing. (See FIGS. 3 and 5). The other end of the output shaft 122 is supported by the servo housing 310 through the ball bearing 402. (See FIG. 4.)

Figure 8:
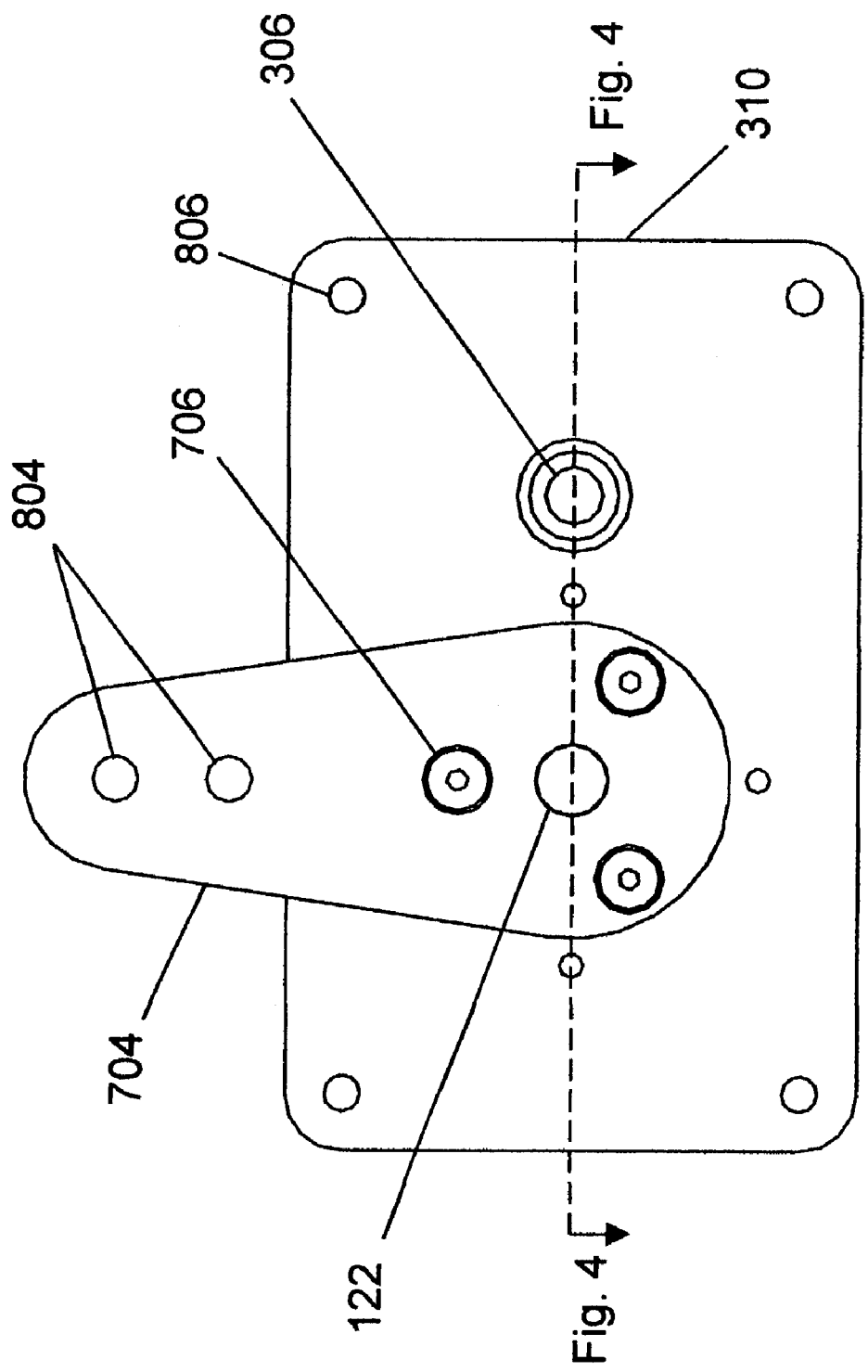
FIG. 8 is a front view of the servo shown in FIG. 3 illustrating the output shaft and an output coupling arm option for coupling to the aircraft.

FIG. 8 is a front view of the servo shown in FIG. 3 illustrating the output shaft 122 and the output coupling arm 704 (optional) for coupling to the aircraft control surfaces 126. Also shown is the housing 310 and mounting holes 806 for mounting the servo 102 to the aircraft. The output coupling arm 704 is mounted with screws 706 to a hub 312 mounted on the output shaft 122. The end of the second shaft 306 is also visible in this view.

The output coupling arm 704 has coupling holes 804 at two distances from the output shaft 122 to provide a selection of control force values to adapt to different installations. Other output coupling options include a capstan and cable combination (not shown) where the cable is attached to the capstan at one location and wraps around the capstan in grooves to prevent abrasion and binding. The cable may then be attached to an existing aircraft cable system or linkages 206. The section line marked 44 indicates the section view illustrated in FIG. 4.

Figure 9:
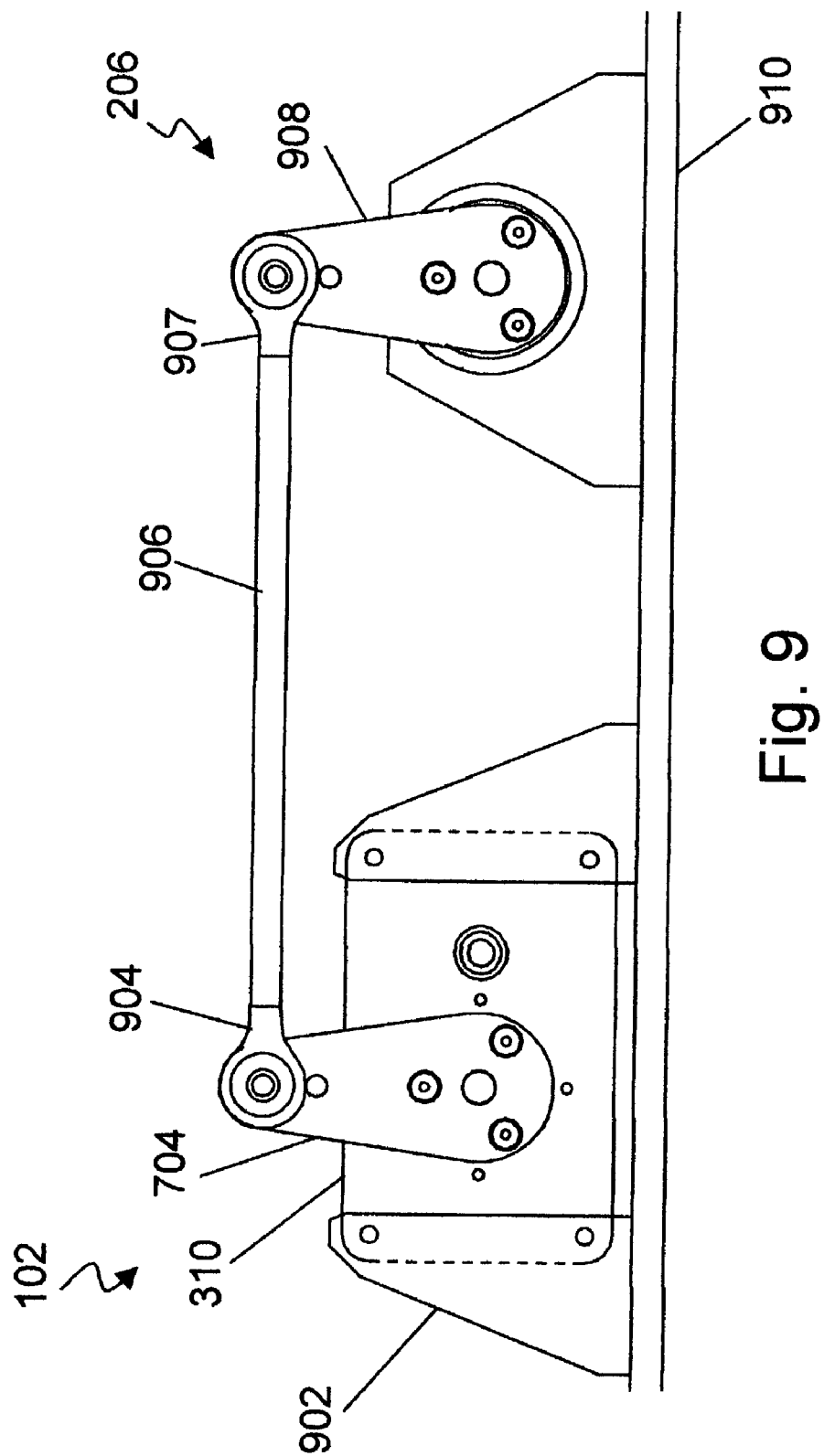
FIG. 9 is a detail drawing showing a typical method for coupling a servo to the aircraft in accordance with the present invention.

FIG. 9 is a detail drawing showing a typical method for coupling the servo 102 to the aircraft, and in particular, to a representative example of the linkage 206, which is coupled to the aircraft control surface 126 (not shown) in accordance with the present invention. FIG. 9 shows the servo housing 310 attached to brackets 902 for mounting to a part of the aircraft frame 910. The output arm 704 is coupled through a first rod end coupling 904 to a rod 906 and further through a second rod end coupling 907 to an arm 908, which is part of the aircraft control linkage 206. Thus, the servo is coupled to a control surface by coupling to a component of the linkage and through the linkage, coupled to the control surface. The linkage may include cables, torque tubes, push pull tubes or other linkages found in aircraft.

It will be understood that the invention is not limited to the specific embodiments described. It is clear, for example, that where gear coupling is employed, belts with pulleys or chains with sprockets may be substituted, as may other rotary transmission mechanisms known in the art. A rotary transmission mechanism may include two coupled gears (or pulleys or sprockets) in order to form a complete gear pass, or may include more than two gears for greater gear ratios. Further, where materials are suggested, other materials known in the art may be used. Other modifications include changing the direction of the clutch or engage mechanism, or adding gears or shafts as intermediates or for increasing the gear ratio. A servomotor may be substituted for the stepping motor. Also, whereas this description has been directed to an aircraft, the invention may also be of benefit for other vehicles such as spacecraft, boats, cars, or trucks. In the other vehicles, the control surfaces may be replaced by such devices as thrusters, rudders, or steering mechanisms.

It is, therefore, contemplated by the appended claims to cover any such modifications that incorporate those features or those improvements that embody the spirit and scope of the present invention.

What is claimed is:

1. A servo control mechanism comprising:
  a motor having a first shaft;
  an engage clutch mounted, at least in part, on said first shaft, said engage clutch coupling rotary motion in accordance with an engage signal;
  a first rotary transmission mechanism driven by said engage clutch;
  a second shaft;
  a slip clutch mechanism concentric with said second shaft wherein said first rotary transmission mechanism drives said second shaft through said slip clutch mechanism, said second shaft driving a second rotary transmission mechanism;
  an output shaft driven by said second rotary transmission mechanism wherein said output shaft is disposed collinearly and axially spaced apart in relation to said first shaft, and said output shaft receives support, at least in part, from said first shaft in cooperation with said engage clutch.

2. The servo control mechanism as in claim 1 wherein said slip clutch mechanism comprises a friction washer and a gear, said gear having a recess for receiving said friction washer, and wherein said friction washer is disposed within said recess in said gear.

3. The servo control mechanism as in claim 1 wherein at least part of said slip clutch mechanism is also part of said first rotary transmission mechanism.

4. The servo control mechanism as in claim 3 wherein said at least part of said slip clutch mechanism is a gear, a sprocket, or a pulley.

5. A servo control mechanism comprising:
  a motor having a first shaft;
  an engage clutch mounted, at least in part, on said first shaft, said engage clutch coupling rotary motion in accordance with an engage signal;
  a first rotary transmission mechanism driven by said engage clutch;
  a second shaft;
  a slip clutch mechanism concentric with said second shaft wherein said first rotary transmission mechanism drives said second shaft through said slip clutch mechanism, said second shaft driving a second rotary transmission mechanism;
  an output shaft driven by said second rotary transmission mechanism wherein said output shaft is disposed collinearly in relation to said first shaft, and said output shaft receives support, at least in part, from said first shaft in cooperation with said engage clutch; said output shaft receiving said support regardless of the engagement of said engage clutch.

6. The servo control mechanism as in claim 5 wherein said slip clutch mechanism comprises a friction washer and a gear, said gear having a recess for receiving said friction washer, and wherein said friction washer is disposed within said recess in said gear.

7. The servo control mechanism as in claim 5 wherein at least part of said slip clutch mechanism is also part of said first rotary transmission mechanism.

8. The servo control mechanism as in claim 7 wherein said 2 at least part of said slip clutch mechanism is a gear, a sprocket, or a pulley.

9. A servo control mechanism comprising:
  a motor having a first shaft;
  an engage clutch mounted, at least in part, on said first shaft, said engage clutch coupling rotary motion in accordance with an engage signal;

a first rotary transmission mechanism attached to said engage clutch and driven by said engage clutch;

a second shaft;

a slip clutch mechanism concentric with said second shaft wherein said first rotary transmission mechanism drives said second shaft through said slip clutch mechanism, said second shaft driving a second rotary transmission mechanism;

an output shaft driven by said second rotary transmission mechanism wherein said output shaft is disposed collinearly in relation to said first shaft, and said output shaft receives support, at least in part, from said first shaft in cooperation with said engage clutch.

10. The servo control mechanism as in claim 9 wherein said slip clutch mechanism comprises a friction washer and a gear, said gear having a recess for receiving said friction washer, and wherein said friction washer is disposed within said recess in said gear.

11. The servo control mechanism as in claim 9 wherein at least part of said slip clutch mechanism is also part of said first rotary transmission mechanism.

12. The servo control mechanism as in claim 11 wherein said at least part of said slip clutch mechanism is a gear, a sprocket, or a pulley.

* * * * *